(12) United States Patent
Alexander

(10) Patent No.: US 6,487,741 B2
(45) Date of Patent: Dec. 3, 2002

(54) MULTI-POSITION RELEASABLE LIP LATCH FOR A DOCK LEVELER

(75) Inventor: James C. Alexander, London (CA)

(73) Assignee: United Dominion Industries, Ontario (CA)

( * ) Notice: Subject to any disclaimer, the term of this patent is extended or adjusted under 35 U.S.C. 154(b) by 0 days.

(21) Appl. No.: 09/835,388

(22) Filed: Apr. 17, 2001

(65) Prior Publication Data

US 2002/0148055 A1 Oct. 17, 2002

(51) Int. Cl.⁷ .................................................. E01D 1/00
(52) U.S. Cl. .......................................... 14/71.3; 14/71.5
(58) Field of Search .............................. 14/69.5, 71.1, 14/71.3, 71.7

(56) References Cited

U.S. PATENT DOCUMENTS

| | | | |
|---|---|---|---|
| 2,974,336 A | 3/1961 | Kelley | |
| 3,249,956 A | 5/1966 | Zajac et al. | |
| 3,636,578 A * | 1/1972 | Dieter | 14/71.1 |
| 3,662,416 A | 5/1972 | Brooks et al. | |
| 3,967,337 A * | 7/1976 | Artzberger | 14/71.7 |
| 3,995,342 A * | 12/1976 | Wiener | 14/71.3 |
| 3,997,932 A * | 12/1976 | Artzberger | 14/71.3 |
| 4,279,050 A * | 7/1981 | Abbott | 14/71.3 |
| 4,398,315 A | 8/1983 | Driear et al. | |
| 4,937,906 A | 7/1990 | Alexander | |
| 5,088,143 A * | 2/1992 | Alexander | 14/69.5 |
| 5,323,503 A | 6/1994 | Springer | |
| 5,475,888 A | 12/1995 | Massey | |
| 5,784,740 A * | 7/1998 | DiSieno et al. | 14/71.3 |
| 5,832,554 A * | 11/1998 | Alexander | 14/71.1 |
| 6,112,353 A | 9/2000 | Winter | |

* cited by examiner

Primary Examiner—Robert E. Pezzuto
Assistant Examiner—Alexandra K. Pechhold
(74) Attorney, Agent, or Firm—Baker & Hostetler, LLP

(57) ABSTRACT

A dock leveler having a frame and a deck pivotably mounted at one end thereof to the frame. A lip is pivotably mounted to the deck at another end thereof. A lip latch and lip extension mechanism are mounted to the leveler and comprises a lip latch pivotably connected to the deck by a crank mechanism and a latch bar pivotably connected to the crank mechanism. The latch bar has one end selectively engaging a latch bracket mounted to the deck. A bar is connected at one end to the crank mechanism and another end is operably connected to the lip. A first spring is operably connected to the crank mechanism and the frame. A second spring is operably connected to the bar and the frame. A third spring operably couples another end of the latch bar to the second spring. Upon upward movement of the deck the first spring urges the crank mechanism in a first direction to move the bar so that the lip is raised from a pendant position to an extended position and the latch bar moves based on movement of the crank mechanism and engages the latch bracket at a first point to hold the lip in the extended position and is maintained in engagement by the third spring.

22 Claims, 9 Drawing Sheets

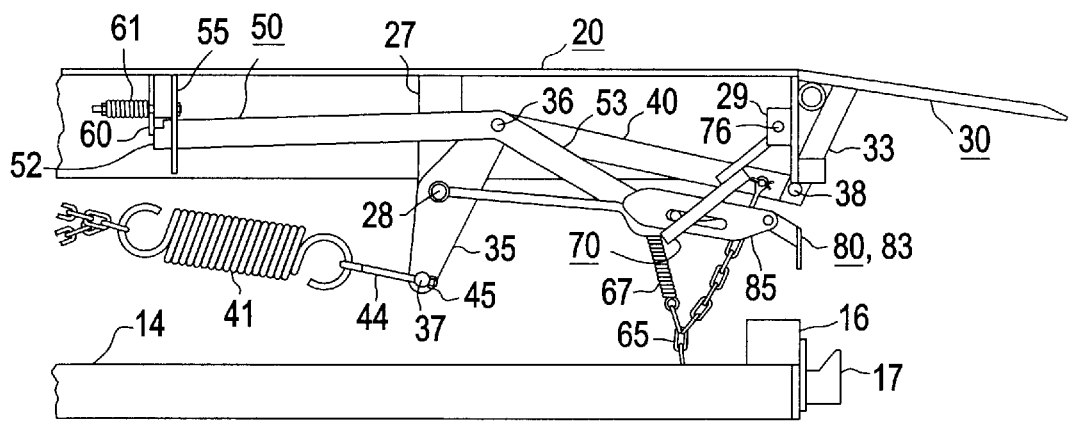
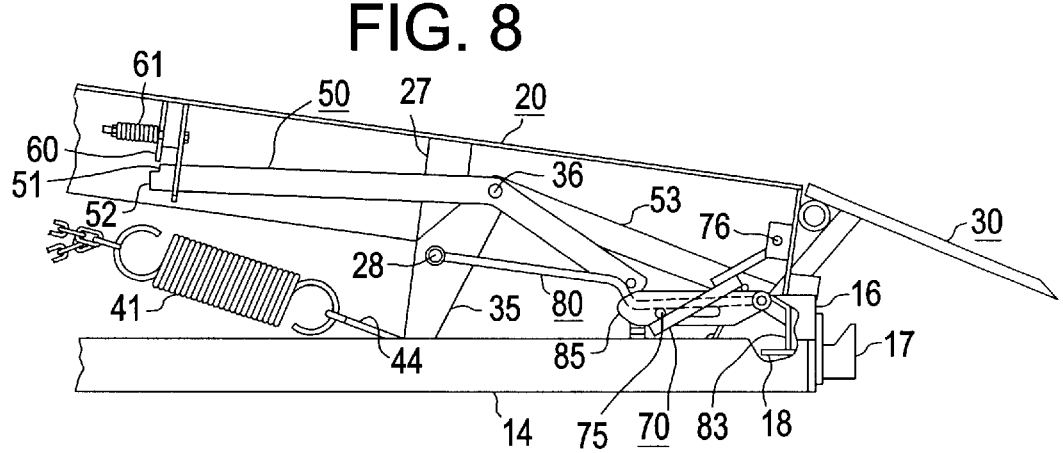
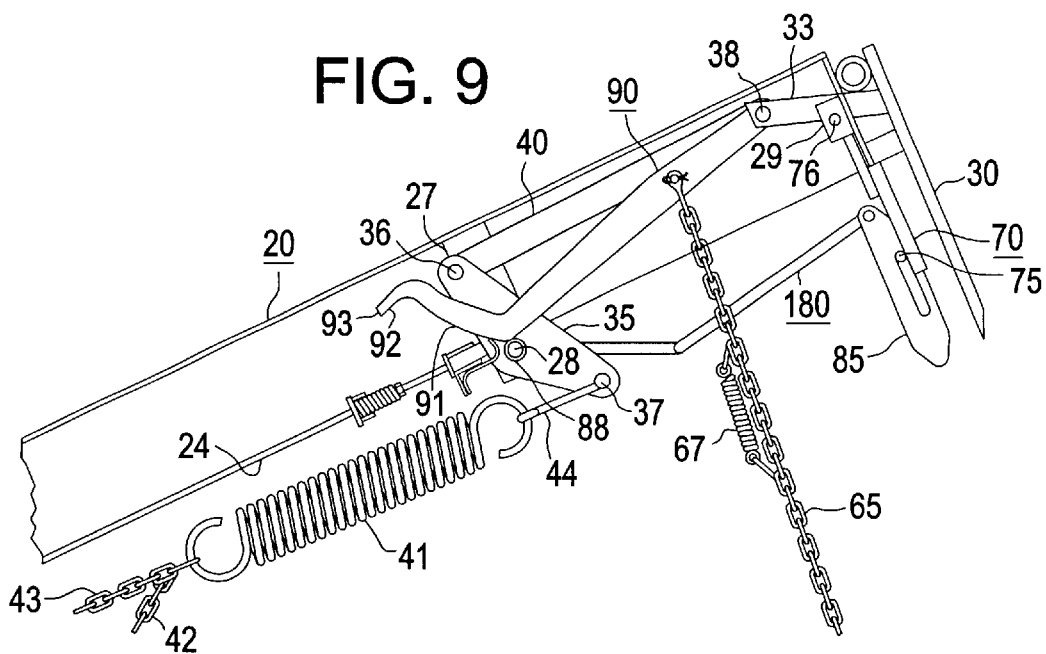

MULTI-POSITION RELEASABLE LIP LATCH FOR A DOCK LEVELER

BACKGROUND OF THE INVENTION

1. Field of the Invention

This invention relates to loading dock equipment and in particular to dock levelers that are used to span the distance between a loading dock and the bed of a vehicle. Specifically, it deals with an improved mechanical latch for the lip of a dock leveler.

2. Prior Art

A conventional dock leveler has a deck assembly which typically stores in a position level with the dock floor, and has a pivoting lip assembly which extends outward to rest on the vehicle which is being loaded. The lip must hinge downward approximately 90 degrees for the lip to be removed from the vehicle and to store the dock leveler with the lip hanging in a pendant position. To move the dock leveler from the stored position to the operative position, the leveler is raised, the lip is extended from the pendant position and the leveler is then lowered until it is supported by the lip resting on the transport vehicle. The use of various mechanisms as a mechanical latch to hold the lip in the extended position until it rests on the transport vehicle is well known in the industry. U.S. Pat. No. 2,974,33 discloses a pawl mounted to the dock leveler engaging a lug on the lip. U.S. Pat. No. 3,249,956 discloses a releasable lip latch that is supported by a spring which will yield to allow the lip to fold if it is inadvertently struck by a backing truck. Both U.S. Pat. No. 3,662,416 and U.S. Pat. No. 4,398,315 show over-center toggle mechanisms as a latch which is yieldable to allow the lip to fold if it is inadvertently subjected to an excessive downward load.

U.S. Pat. No. 4,937,906 discloses a lip counterbalance spring attached to the frame instead of the deck as is conventional in this technology. The purpose is to provide extra force to extend the lip. The advantage of this system is that the lip is at least partially counterbalanced throughout the operating range of the leveler. Another more complicated system is disclosed in U.S. Pat. No. 6,112,353 disclosing a yieldable lip latch.

A major limitation of prior art mechanical lip latches has been that the lip latch does not automatically disengage and allow the lip to fall to the pendant position if the lip is extended when a transport vehicle is not present and when safety legs or cross traffic legs are engaged. Safety legs or cross traffic legs are well known in the dock leveler industry and are used to limit the distance that the deck will fall if the transport vehicle inadvertently pulls away when the leveler is supported by the lip resting on the vehicle. However the presence of safety legs can cause problems for prior art mechanical lip latches. Several designs including U.S. Pat. No. 3,662,416 and U.S. Pat. No. 5,475,888 disclose a means to release the lip latch when the dock leveler descends to its lowest position. However when safety legs or cross traffic legs are engaged, the dock leveler is prevented from descending to its lowest position and the latch will remain engaged until the lip is manually lifted to allow the latch to release. A second problem with mechanical lip latches is referred to in the industry as "stump out" and occurs when the bed of the transport vehicle is lower than the lip when the safety legs engage the frame of the leveler. Unless the dock operator notices the problem and retracts the safety legs, the lip will be supported by the lip latch and not by the bed of the vehicle. A fork truck driven over the lip will force it down and cause severe damage to the lip latch.

One attempt to address this problem has been the use of a viscous damper commonly referred to as a "hydrashock" to replace the lip latch. Such a device is shown in U.S. Pat. No. 5,323,503. The lip is able to freely extend but the rate of fall of the lip is retarded by the viscous resistance of the damper. Thus if the lip is left extended without the support of a transport vehicle, the lip slowly falls by gravity. While eliminating some of the problems associated with mechanical lip latches, the viscous damper has its own significant limitations. The viscosity of the oil in the damper changes with temperature. As the viscosity decreases in warm weather the rate of fall of the lip increases and the lip may not remain extended long enough to properly engage the bed of the transport vehicle. Conversely as the viscosity increases in cold weather, the rate of fall of the lip may be so slow that it impedes the ability to move the leveler from the transport vehicle to the stored position with the lip pendent. Most dock levelers with such devices provide multiple mounting positions of the damper so that the force resisting lip falling may be modified for large changes in ambient temperature.

Another attempt to provide a yieldable latch is set forth in U.S. Pat. No. 4,398,315. The configuration disclosed is a latch that releases by buckling within the link to the lip rather than by a latch mounted to the dock leveler. Another proposed solution is found in U.S. Pat. No. 6,112,353 which employs a yieldable lip latch with a compensating link supporting the lip bellcrank.

Dock levelers use various means to raise the deck and extend the lip. Dock levelers which are upwardly biased with springs are typically "walked down" from the elevated position by dock worker placing his weight on the deck and the rate of decent is relatively rapid. Dock levelers which use powered means such as an electric actuator, hydraulic cylinder or inflatable bag to raise the leveler have a slower rate of decent. While the viscous damper may provide satisfactory performance for a "walk-down" type of mechanical leveler, it is much less suitable for use with power actuated levelers having a slower rate of descent. If the viscous damper were stiff enough to hold the lip extended until the leveler lowered the lip to the transport vehicle then an unacceptably long time would be required to allow the lip to fall while restoring the leveler.

SUMMARY OF THE INVENTION

This invention is a mechanical lip latch that automatically disengages at multiple positions of deck height depending on whether the safety legs are engaged. The latch is disengaged at the lower limit of downward travel of the dock leveler. The lower limit is determined by whether the safety legs are engaged or retracted. The latch also has multiple positions of engagement to ensure that the lip is supported even if it is not fully extended. The latch is also designed to yield and disengage to protect it from damage if excess force is applied to the lip.

The first preferred embodiment has a lip extension structure suited for the faster activation speed of an upwardly biased "walk down" dock leveler. The second preferred embodiment has a lip extension method better suited for the slower activation speed of a powered up, a downwardly biased dock leveler. In each of these embodiments the ability to vary the lip tension is a significant benefit. For example the ability to increase the tension may be limited so that the lip can fall when the leveler is raised from a high truck.

In the third preferred embodiment a single lip spring is attached to the deck to maintain support for the lip and additionally is releasably attached to the frame. This spring is engaged to the frame only when the lip nearly fully pendant and therefore the spring tension may be increased as the deck is raised to extend the lip without the necessity of using a lip cam as in the second preferred embodiment. This embodiment also uses a lip latch which is biased toward the release position only when the deck is lowered to the working position. Thus a second spring to overcome the release spring when the deck is raised is unnecessary.

In the first and second preferred embodiments the lip spring tension is varied but the increase in tension has a limit or else the lip may not fall when the leveler is raised from the bed of a truck that is high. In the third embodiment a single lip spring is employed, attached to the deck to maintain support for the lip. It is releasably attached to the frame. The spring is engaged with the frame only during the period of time when the lip is nearly fully pendant and therefore the spring tension may be sufficiently increased as the deck is raised to extend the lip without requiring the lip cam of the second embodiment. The third embodiment also has a lip latch which is biased toward to release position only when the deck is lowered to the operative position and thus does not require a second spring to overcome the force of the release spring.

In accordance with this invention there is a provision for a multi-position latch trip. This allows the release of a mechanical lip latch at multiple positions of deck height as a function of the deployment state of the safety legs.

This invention will be described more completely by reference to the drawing and the description of the preferred embodiments that follow.

BRIEF DESCRIPTION OF THE DRAWING

FIG. 7 is a sectional side view of the first preferred embodiment of this invention with the safety legs retracted and the leveler almost fully lowered;

FIG. 8 is a sectional side view of the first preferred embodiment of this invention with the leveler fully lowered and the lip latch disengaged;

FIG. 9 is a partial sectional side view of the second preferred embodiment of this invention with the leveler raised and the lip in the pendant position;

DESCRIPTION OF THE PREFERRED EMBODIMENTS

Figure 1:
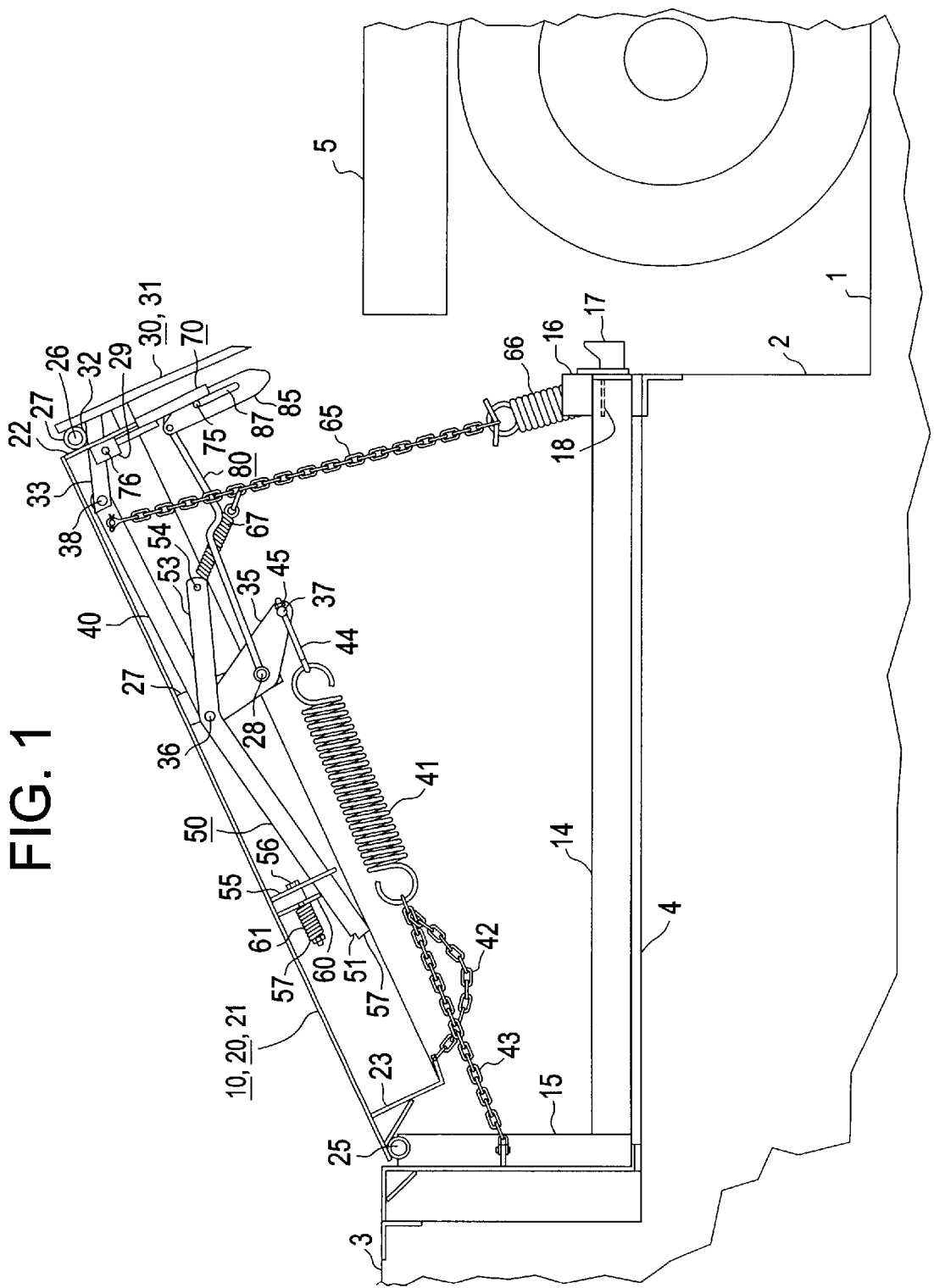
FIG. 1 is a sectional side view of the first preferred embodiment of this invention with the leveler raised and the lip in the pendant position.

Referring now to FIGS. 1 through 8 the essential components of the first preferred embodiment of this invention will be described, it being understood that a typical dock leveler has other constructional features, not illustrated. A loading dock is shown with a driveway approach 1, a dock face 2, and a dock floor 3 with a recessed pit 4. A transport vehicle 5 is shown in front of the dock. The dock leveler 10 is typically mounted in the pit 4. A frame has horizontal members 14 and a vertical brace 15 both of which rest in the pit. The leveler frame also has stop blocks 16 and lip keepers 17 at the forward end of the horizontal members 14. A trip plate 18, shown in broken lines in FIG. 1, is attached to the far side of one horizontal member 14 at a predetermined distance below the top of the stop block 16. The leveler 10 has a deck 20 which has a top plate 21, a plate 22 that forms a front header and a plate 23 that forms a rear header. Deck beams 24 attached to the top plate and header bars provide structural strength to the assembly. The deck 20 is pivoted to the frame at pivot 25.

A lip 30 is pivoted to the deck on a pin 26 inserted in hinge tubes 27 attached to the front header bar 21 and hinge tubes 32 attached to the lip plate 31. Control arms 33 are attached to the lip plate 31. Although not illustrated, the leveler is held horizontal in the stored position with the lip 30 in the pendant position and retained in the lip keepers 17. The lifting of the dock leveler to the position shown in FIG. 1 may be accomplished by any means including mechanical linkage and springs, electric actuator, hydraulic cylinder or inflatable bag. Such is not material to the functioning of this invention.

Figure 5:
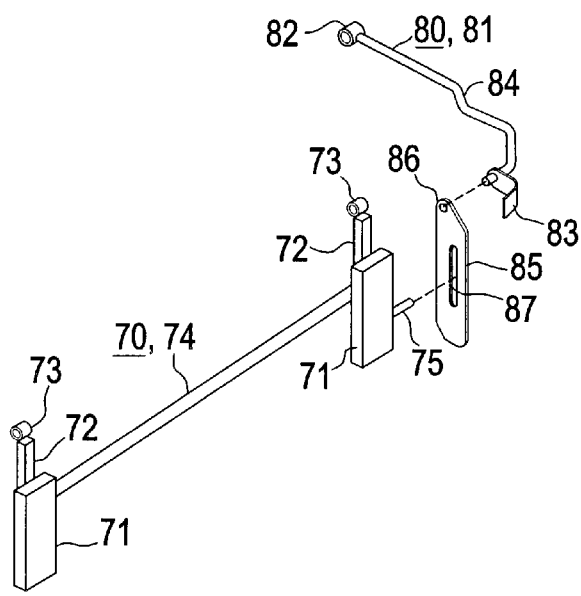
FIG. 5 is an exploded view showing the safety legs, lip latch trip rod and trip bar.
Figure 6:
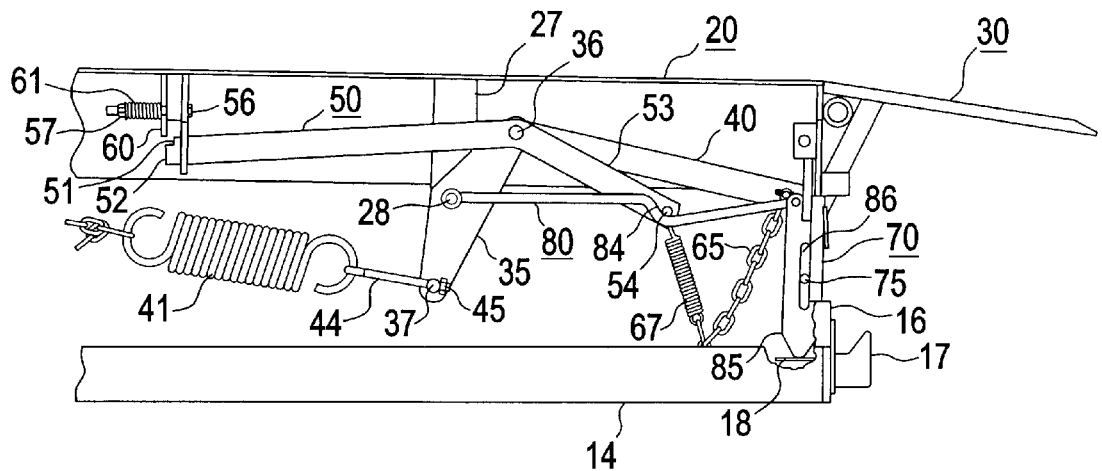
FIG. 6 is a sectional side view of the first preferred embodiment of this invention with the leveler lowered to rest on the safety legs and the lip latch disengaged.

Two pairs of brackets 29 are attached to the front header plate 22 to carry the safety legs 70 on pivot pins 76. As shown in FIG. 5 the safety legs comprise two vertical bars 71. Each bar 71 is attached to a pivot boss 73 by an arm 72. A cross bar 74 joins both vertical bars 71 to ensure that they move in and out of engagement together. One bar 71 carries a pin 75 to control the lip trip mechanism that will be described later. When in the forward position the vertical bars 71 are placed between the front header plate 22 and the stop blocks 16 to limit the downward travel of the deck 20 as shown in FIG. 6. The safety legs 70 are urged forward to the operative position by a spring, not illustrated. To allow the deck to fall lower the safety legs must be manually retracted, typically by the operator pulling on a chain that is also not illustrated.

The deck 20 also carries a support bar 27 with a pivot pin 28. A crank assembly 35 pivots on the pin 28 and carries pins 36 and 37. A bar 40 is attached at one end to the pin 36 and at the other end to the lip control arms 33 by a pin 38. A spring 41 is attached to the pin 37 on the crank assembly 35 by an adjusting bolt 44 and a nut 45. The other end of the spring 41 is attached to two chains 42 and 43 which are attached to the deck 20 and a vertical frame brace 15 respectively.

Figure 4:
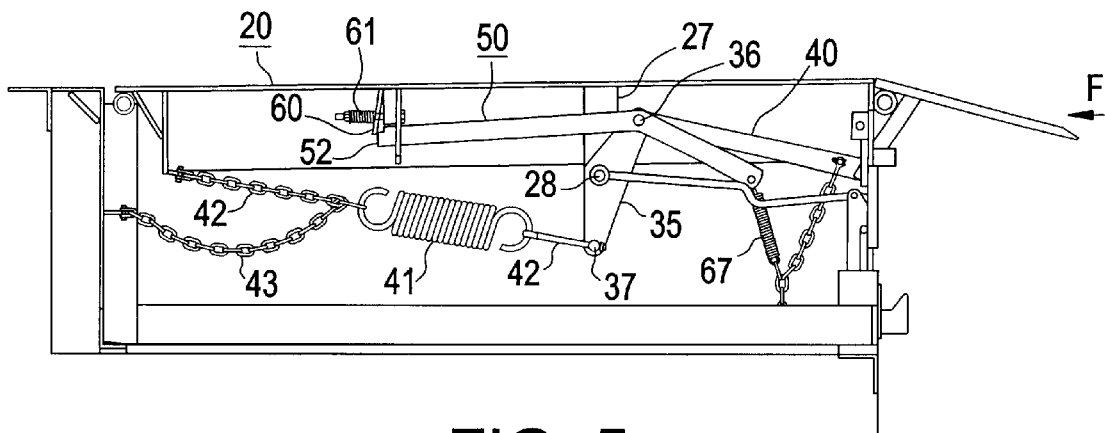
FIG. 4 is a sectional side view of the first preferred embodiment of this invention with the leveler lowered to an operative position and the lip latch deflected by an external force on the lip.

As shown in FIG. 4, when the leveler is lowered to an operative position, near horizontal, the chain 43 is slack and the spring 41 is held by chain 42 attached to the deck 20. The adjusting bolt 44 is positioned by the nut 45 to tension the spring 41 so that most of the weight of the lip 30 is counterbalanced. The tension of the spring must allow the lip to fall by gravity to the pendent position for storing.

Figure 2:
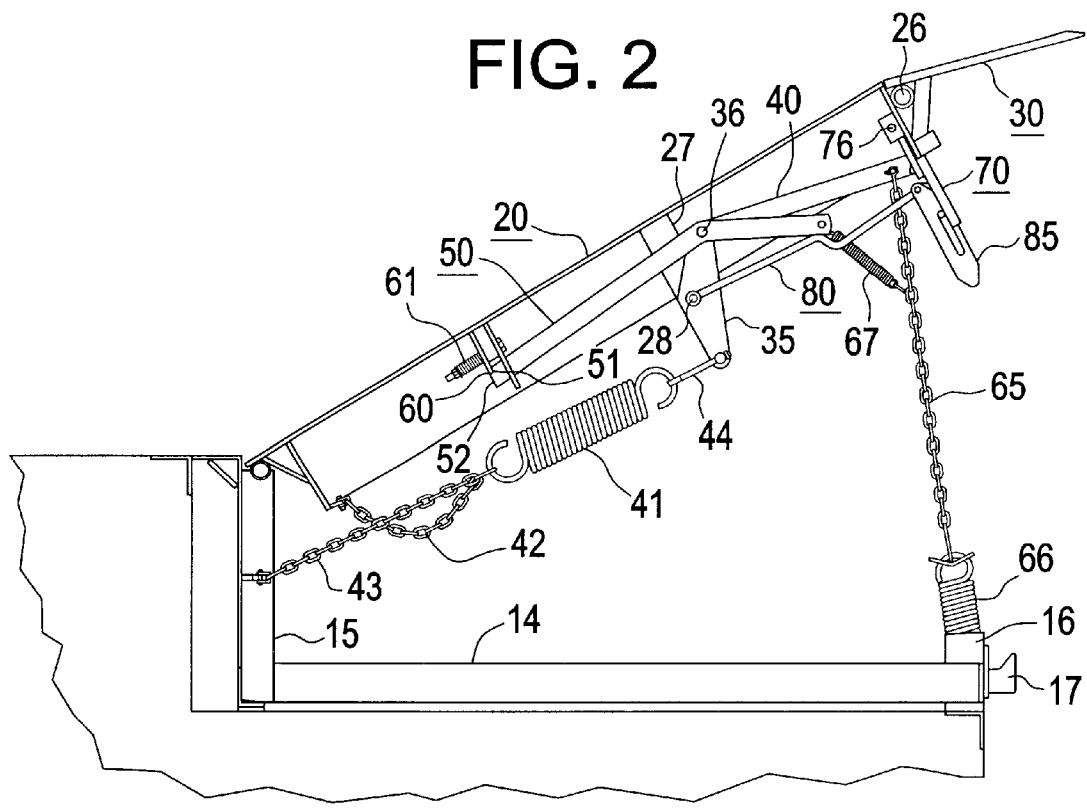
FIG. 2 is a sectional side view of the first preferred embodiment of this invention with the leveler raised and the lip held by the lip latch in a partially extended position.
Figure 3:
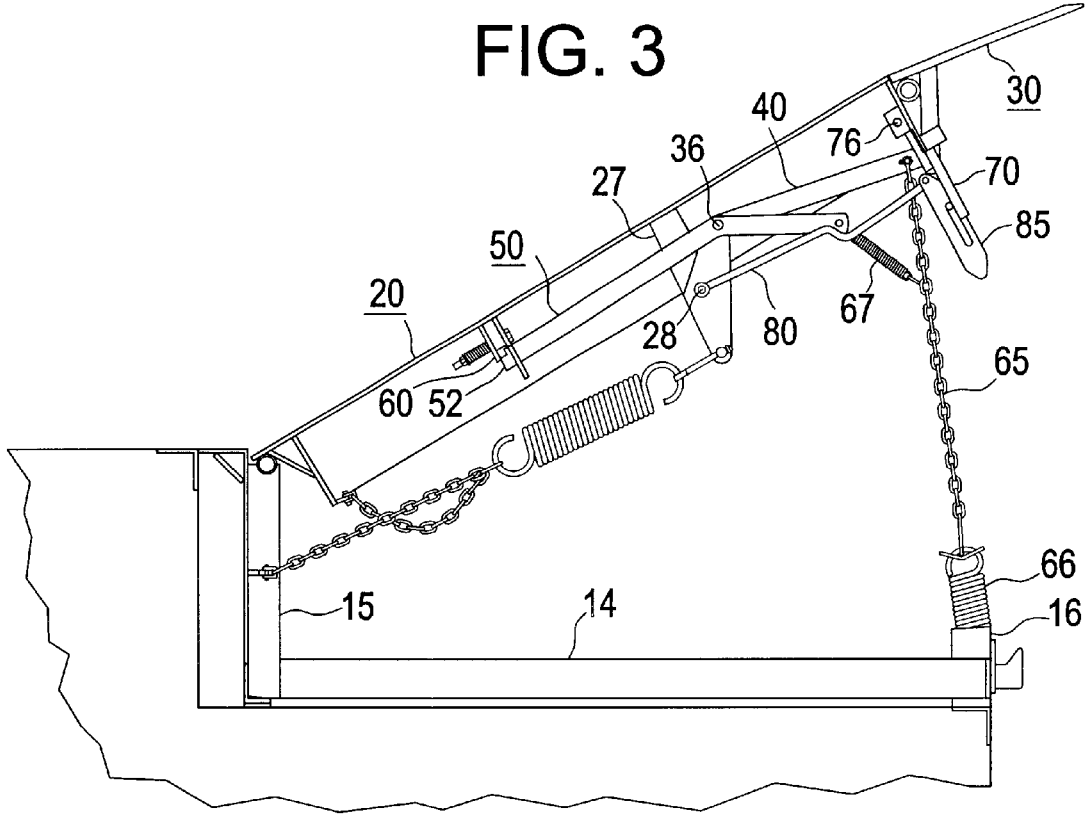
FIG. 3 is a sectional side view of the first preferred embodiment of this invention with the leveler raised and the lip held by the lip latch in a fully extended position.

Referring now to FIGS. 1, 2 and 3, rotation of the deck 20 to the raised position causes the chain 43 to increase the tension of the spring 41 and thereby provide greater assistance in rotating the lip 30 to the extended position.

Referring now to FIGS. 1 through 8 the operation of the first preferred embodiment of the lip latch and extension mechanism will be described. As shown in FIG. 1, a latch bar 50 pivots on the pin 36 of the crank assembly 35. One end of the latch bar 50 has a notch that provides two engagement surfaces 51 and 52. The other portion of the latch bar 50 carries a release arm 53 and a pin 54. A latch bracket 55 is attached to the deck and has a slotted opening which guides the end of the latch bar 50 yet allows some limited vertical travel. A latch plate 60 is attached to the latch bracket 55 by a bolt 56, nut 57 and spring 61. A chain 65 has one end attached to the bar 40 and the other end to a spring 66 which is then attached to the frame member 14. A spring 67 has one end attached to the chain 65 and the other end attached to the pin 54 on the latch bar 50. As the dock leveler is lifted toward the position shown in FIG. 1 the chain 65 is stretched taut and pulls the front of the bar 40 against the pin 38, causing the lip 30 to rotate rapidly towards the extended position. The spring 66 stores energy and limits the force exerted on the chain 65. The chain 65 and spring 66 also limit the upward travel of the deck 20. Because the latch bar 50 heavier than the control arm 53 gravity urges the latch bar to fall out of engagement. The spring 67 is pulled taut by the chain 65 and causes the latch bar 50 to rotate clockwise into engagement with the latch plate 60.

As the lip 30 approaches the extended position shown in FIG. 2 the line of the force exerted on the pin 38 moves much closer to the lip pivot pin 26 and the rotational moment exerted by the chain on the lip is greatly reduced. The lip 30 is urged toward the fully extended position by rotational inertia and by the force exerted on the lip bar 40 by the lip spring 41 acting on the crank assembly 35. Because resistance to extension of the lip is dependent on the factors such as wear, debris and lack of lubrication, the energy available may not always be sufficient to fully extend the lip. FIG. 2 shows the lip 30 almost fully extended with the surface 51 of the latch bar 50 engaging the latch plate 60. Although not fully extended, the lip 30 is still held in a position where it can properly engage the bed of a transport vehicle. Without the alternate latch position provided by the surface 51, the lip would fall back to the pendant position as the deck is lowered. FIG. 3 shows the lip 30 fully extended with the surface 52 of the latch bar 50 engaging the latch plate 60. Because the tension of the spring 41 is increased when the deck 20 is fully raised, the weight of the lip 30 may not be sufficient to overcome the spring 41 and hold the latch bar 50 in contact with the latch plate 60.

The spring 67 maintains the latch bar 50 in the engaged position. As the deck 20 is lowered and the tension of both springs 41 and 67 is reduced and gravity urges the latch bar 50 to fall out of engagement with the latch plate 60. The weight of the lip 30 acting on the bar 40 holds the end of the latch bar 50 against the latch plate 60 and the lip 30 is prevented from falling. When the deck 20 lowers and the lip 30 is supported by a transport vehicle, the load is removed from the latch bar 50 and it falls out of engagement with the latch plate 60 allowing the lip to fall when the dock leveler is stored.

FIG. 4 illustrates the dock leveler with the lip 30 extended and an external force "F" exerted essentially horizontally on the end of the lip. The spring 61 has sufficient compression to withstand the force exerted on the latch bar 50 by the weight of the lip 30. When the force on the latch bar 50 exceeds the compression load of the spring 61 the spring will deflect and allow the latch plate 60 to rotate. The end of the latch bar 50 will then slip out of engagement with the latch plate 60 and the lip 30 will fall pendent.

The components that automatically disengage the lip latch 50 will now be described. As shown on FIG. 5 a trip bar 80 has a formed member 81 with its rearward end attached to a pivot boss 82. An angle bracket 83 is attached near the forward end of the member 81. A control surface 84 is formed into the middle part of the member 81. FIG. 5 also shows a trip bar 85 that has a pivot hole 86 and an elongated hole 87. As shown in this exploded view, the end of the rod 81 engages the hole 86 to carry the trip bar 85. The pin 75 on the safety leg assembly 70 engages the elongated hole 87 in the trip bar 85.

As illustrated in FIGS. 1, 2 and 3 the trip rod pivots on pin 28. The forward end of the trip rod 80 is supported by the trip bar 85 which is supported at the top of the elongated hole 87 by the pin 75 on the safety legs 70.

FIG. 6 illustrates how the lip latch is automatically disengaged as the deck 20 is lowered and the safety legs 70 rest on the stop blocks 16. In FIGS. 1 through 4 the vertical position of the stop bar 85 is determined by the pin 75 on the safety legs 7 supporting the top of the elongated hole 87. FIG. 6 has the stop block 16 cut away to show the stop plate 18 attached to the frame member 14.

As the deck 20 falls the lower end of the trip bar 85 rests on the trip plate 18. Thus the forward end of the trip rod 80 is held at a predetermined height above the trip plate 18 as the deck 20 is lowered to rest on the safety legs 70. As the deck 20 moves down the trip rod 80 rotates upward relative to the deck 20. The control surface 84 on the trip rod 80 engages the pin 54 on the latch bar 50 forcing the control arm 53 upward and the end of the latch bar 50 downward and out of engagement with the latch plate 60. The lip 30 is now free to fall to the pendent position.

FIG. 7 illustrates the condition where the dock leveler with the safety legs moved to a retracted position. The pin 75 on the safety legs 70 causes the trip bar 85 to rotate rearward and expose the angle bracket 83. Thus, as the deck 20 falls to the fully lowered position shown in FIG. 8, the trip bar 85 does not engage the trip plate 18 and the lip latch does not disengage prematurely. However when the deck 20 is fully lowered the angle bracket 83 engages the trip plate 18 and this causes the lip latch 50 to disengage from the latch plate 60 as described herein.

A second preferred embodiment of the invention is illustrated in FIGS. 9, 10, 11 and 12. This embodiment is better suited for a powered dock leveler where the rate of lifting the deck is much slower and there is insufficient rotational inertia of the lip to ensure that it is fully extended. With the exception of the lip latch and release components, the dock leveler has the same components as the first preferred embodiment.

FIG. 9 shows a roller 88 on the pin 28. A latch bar 90 pivots on the pin 38. The latch bar 90 has a cam surface 91, a stop surface 92 and a latch surface 93. The chain 65 is attached to the latch bar 90 rather than to the lip bar 40 as in the first preferred embodiment. The trip rod 180 is similar to the trip rod 80 of the first preferred embodiment except for having a different formed shape.

Figure 10:
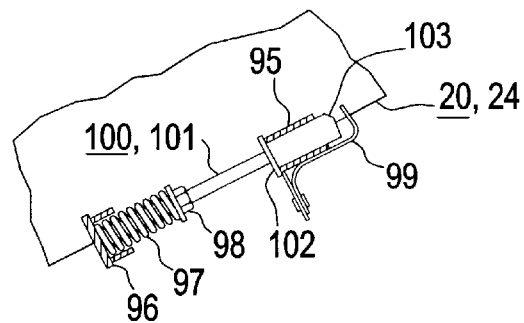
FIG. 10 is an enlarged partial sectional view of the latch assembly of the second preferred embodiment of this invention.

In FIG. 10 the latch housing 95 and spring housing 96 are mounted to the deck 20. A latch assembly 100 has an adjustable bolt 101, flange 102 and latch block 103 which is free to move axially in the latch housing 95. A latch spring 97 is supported in the spring housing 96 and acts against a nut 98 to urge the flange 102 of the latch assembly 100 against the end of the latch housing 95. The latch housing 95 also carries a latch release spring 99.

When the lip is in the pendent position as shown in FIG. 9, tension in the chain 65 acts on the latch bar 90 to pull down on the pin 38 and cause the lip 30 to rotate. As the lip approaches the extended position shown in FIG. 11 the line of force exerted on the pin 38 moves much closer to the lip pivot pin 26 and the rotational moment exerted by the chain 65 on the lip 30 is greatly reduced. The lip 30 is urged toward the fully extended position shown in FIG. 11 by force exerted on the lip bar 40 by the lip spring 41 acting on the crank assembly 35 and by the cam surface 91 bearing on the roller 88. Any increase in resistance to extension of the lip caused by factors such as wear, debris and lack of lubrication may be overcome by increasing the tension on the chain 65. The lip 30 is fully extended when the stop surface 92 of the latch bar 90 contacts the roller 99. The stop surface 92 also deflects the latch release spring 99. The latch surface 93 is positioned against the end of the latch block 103.

As in the first preferred embodiment, in this embodiment, the weight of the lip 30 may not be sufficient to overcome the spring 41 and hold the latch bar 90 in contact with the latch block 103. The spring 67 maintains the latch bar 90 in the engaged position until the deck 20 has lowered. The tension of the spring 41 decreases and the weight of the lip 30 is sufficient to hold the latch surface 93 against the end of the latch block 103. When the deck 20 lowers and the lip 30 is supported by a transport vehicle, the load is removed from the latch bar 90. Because forward travel of the latch block 103 is limited by the flange 102 bearing against the end of the housing 95, the latch bar 90 moves away from the latch block 103. The release spring 99 lifts the end of the latch bar out of engagement and the lip is free to fall. The latch spring 97 has sufficient compression to withstand the force exerted by the weight of the lip 30 acting on the latch bar 90. However an external force exerted on the end of the lip will cause the latch spring 97 to deflect. The cam surface 91 acting on the roller 88 will cause the latch arm 90 to be lifted out of engagement with the latch block 103 and the lip will be free to fall.

Figure 12:
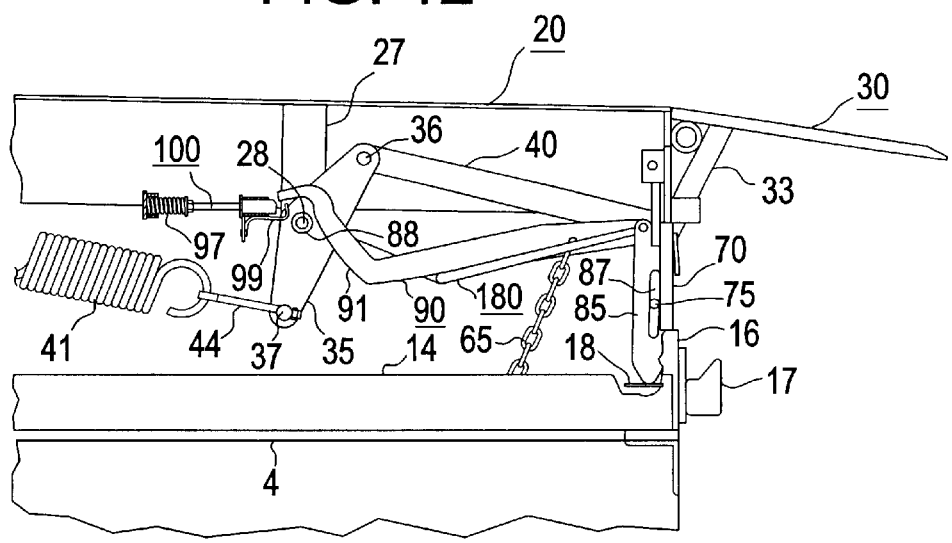
FIG. 12 is a partial sectional side view of the second preferred embodiment of this invention with the leveler fully lowered and the lip latch disengaged.

FIG. 12 illustrates how the lip latch is automatically disengaged as the deck 20 is lowered and the safety legs 70 rest on the stop blocks 16. As in the first preferred embodiment, in this embodiment, the lower end of the trip bar 85 contacts the trip plate causing the trip rod 80 to rotate upward as the deck 20 is lowered. The trip rod 80 engages the bottom surface of the latch bar 90 forcing the end of the latch bar out of contact with the latch block 103 and allowing the lip 30 to fall by gravity. As in the first embodiment, when the safety legs 70 are retracted the pin 75 on the safety legs 70 causes the trip bar 85 to rotate rearward and expose the angle bracket 83. Thus as the deck 20 falls to the fully lowered position the angle bracket 83 engages the trip plate 18 and causes the lip latch 50 to disengage from the latch plate 60 as described previously.

Figure 13:
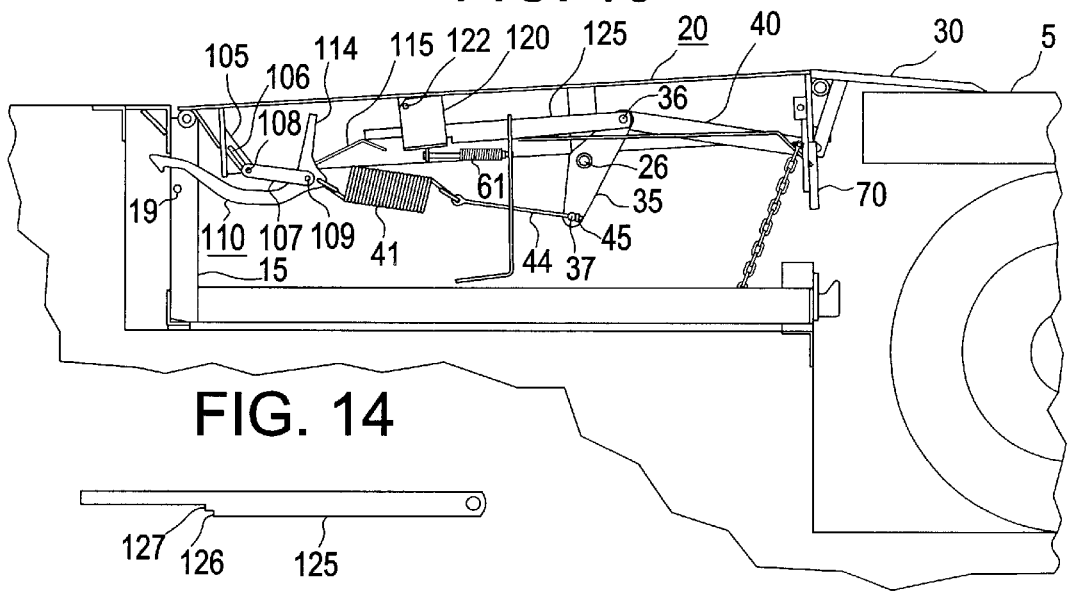
FIG. 13 is a sectional side view of the third preferred embodiment of this invention with the lip extended and resting on a transport vehicle.
Figure 14:
FIG. 14 is an enlarged view of the latch bar.
Figure 15:
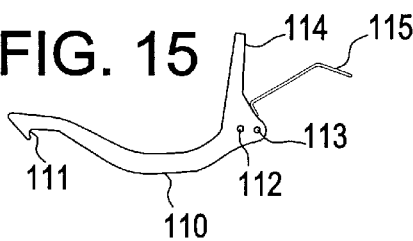
FIG. 15 is an enlarged view of the hook assembly for the lip spring.

A third preferred embodiment of the invention is illustrated in FIGS. 13 through 21. This embodiment is also suited for a powered dock leveler where the rate of lifting the deck is much slower and there is insufficient rotational inertia imparted to the lip 30 by the lip chain 65 to ensure that the lip is fully extended. FIG. 13 shows a dock leveler with the lip 30 resting on a transport vehicle 5. The frame member 15 carries an anchor pin 19. The deck 20 has a bracket 105 having a slotted hole 106. A pair of link bars 107 are attached to the bracket 105 by a pin 108. FIG. 15 shows a hook assembly 110 having a hook 111 and attachment holes 112 and 113. A lever arm 114 projects upward and carries a cantilevered spring 115. The hook assembly 110 is attached to the end of the link bars 118 by a pin 109 passing through the hole 112. The spring 41 has one end attached to the hook assembly 110 through the hole 113 and the other end to the pin 37 on the crank 35 with the adjusting rod 44 and nut 45. The rod 44 is adjusted so that most of the weight of the lip 30 is counterbalanced by the tension of the spring 41 while still allowing the lip to fall by gravity when the deck 20 is raised from the transport vehicle 5. As shown in FIG. 13 the spring 41 pulls the hook assembly 110 into alignment between the end of the bracket 105 on the deck 20 and the pin 37. The hook assembly 110 is thus held so that the hook 11 is positioned above the pin 19 on the frame member 15.

Figure 16:
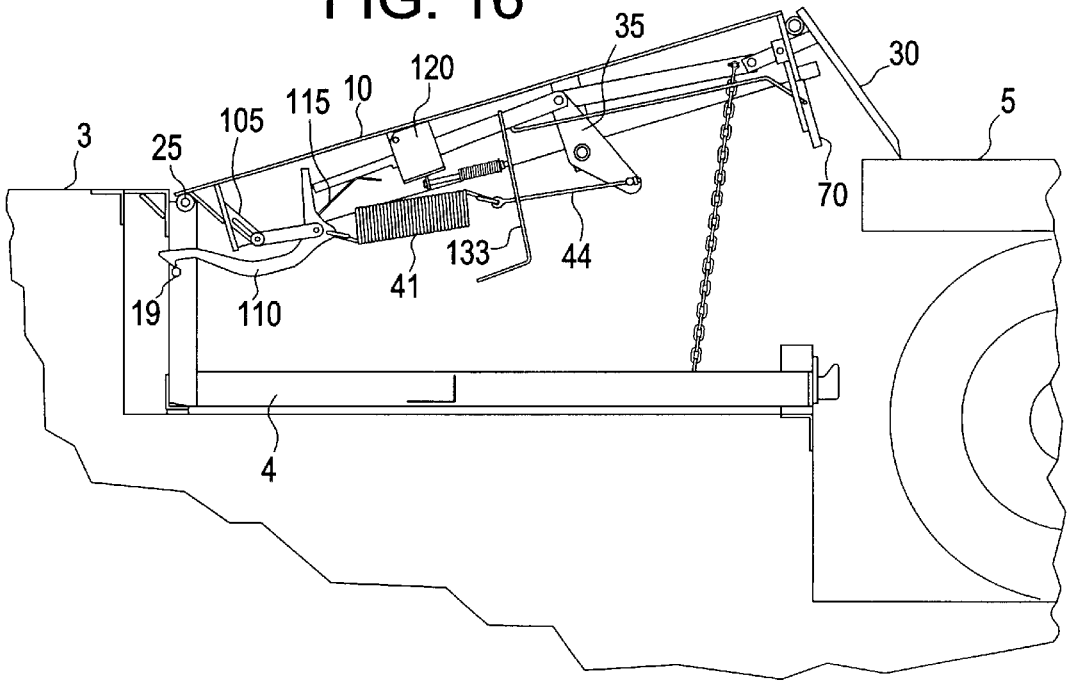
FIG. 16 is a sectional side view of the third preferred embodiment of this invention with the deck raised to remove the lip from the transport vehicle.

When the deck 20 is raised to allow the lip to fall as shown in FIG. 16, the hook 111 does not engage the pin 19. Consequently, the tension of the spring 41 is not increased as the deck 20 is raised.

Figure 17:
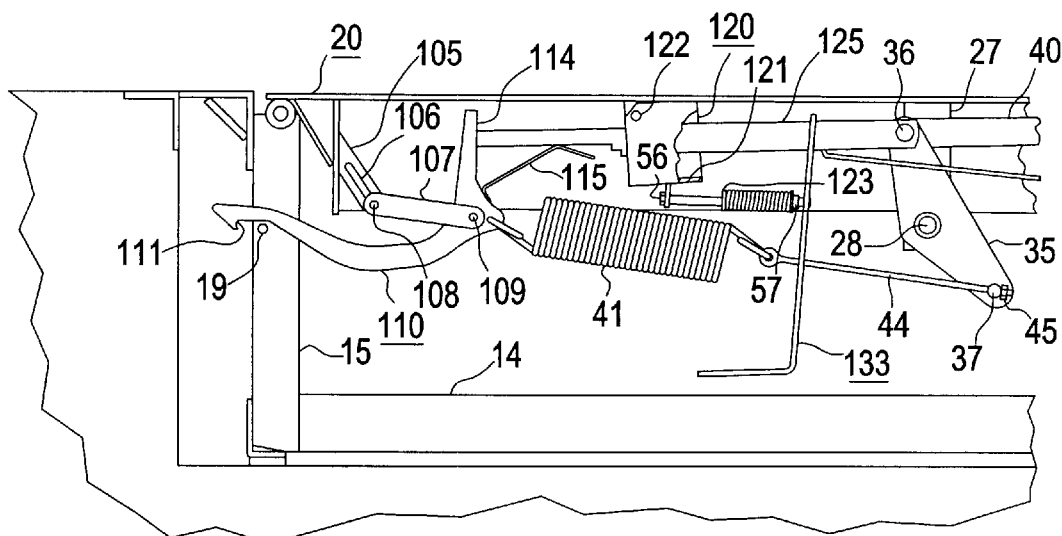
FIG. 17 is a partial sectional side view of the third preferred embodiment of this invention with the lip latch forcing the hook into engagement with the frame.

FIG. 17 illustrates an enlarged partial view of the dock leveler in the stored position. A latch housing 120 has a latch plate 121 and is pivoted on the deck with a pin 122. A bracket 123 is anchored to the deck 20 and the latch housing 120 is held in a forward position by the spring 61, bolt 56 and nut 57. The latch bar 125, shown in FIG. 14, has two latch surfaces 126 and 127. The latch bar 125 is attached to the pin 36 on the crank 35 and passes through the latch housing 120. As shown in FIG. 13, when the lip is extended the latch bar 125 is moved forward away from the arm 114 on the hook assembly 110. Because the lip is supported on the transport vehicle there is no load on the latch bar 125 and the spring 115 urges the latch bar 125 upward to lift the latch surfaces 126 and 127 out of engagement with the latch plate 121. FIG. 16 shows the end of the latch bar 125 moving closer to the lever arm 114 of the hook assembly 110 as the lip 30 rotates toward the pendent position.

FIG. 17 shows the dock leveler in the stored position. When the lip 30 is fully lowered the end of the latch bar 125 contacts the lever arm 114 to rotate the hook assembly 110 and force the hook 111 to a position where it will engage the pin 19 when the deck 20 is raised.

Figure 19:
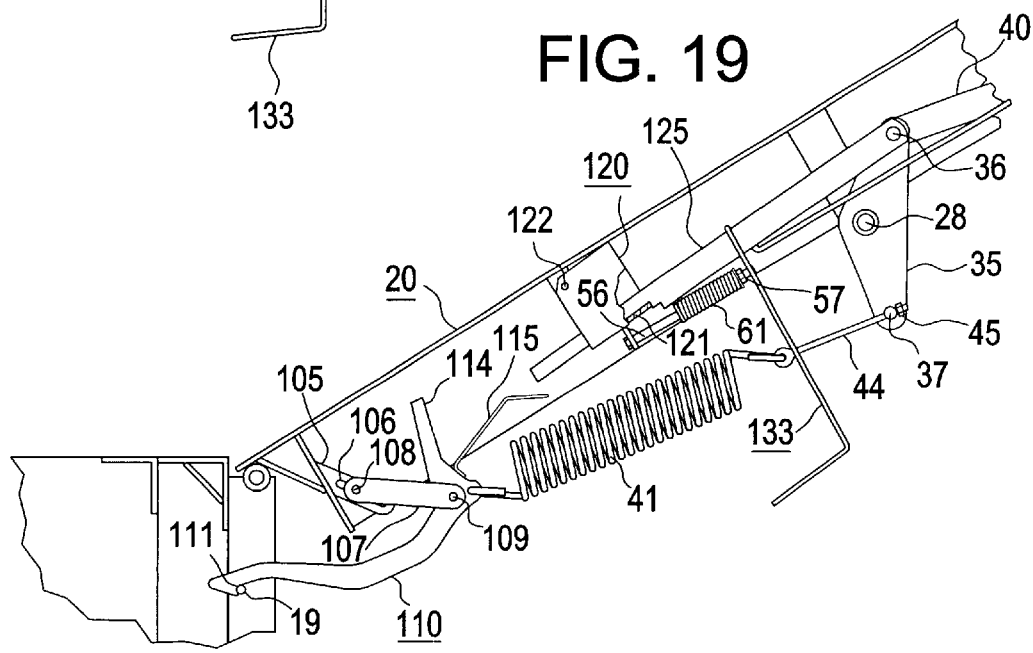
FIG. 19 is a partial sectional side view of the deck raised and the hook providing increased tension for the lip spring.

FIG. 19 shows the deck fully raised with the hook 111 engaging the pin 19. The deck 20 has rotated forward relative to the hook assembly 110 and the end of the spring 41 has been pulled rearward relative to the bracket 105. The pin 108 has moved in the slotted hole 106 to allow the link bars 108 to move rearward with the spring 41 and hook assembly 110. Thus the tensional force of the spring 41 may be increased to exceed the weight of the lip 30 so that the lip can be fully extended by the force of the spring 41. As the lip 30 is extended the latch bar 125 moves forward and out of contact with the spring 115 allowing the latch bar to fall with the latch surface 127 placed to engage the latch plate 121 as shown in FIG. 19.

As described in the second preferred embodiment, in this embodiment the alternate latch position 126 will allow the latch to engage even if the lip does not full extend. The cantilever spring 115 will not engage the end of the latch bar 125 until the deck 20 has lowered to a position where the hook assembly 110 no longer exerts extra tension on the spring 41. Thus the latch bar 125 will remain in the engaged position until the weight of the lip 30 forces the latch surface 127 into contact with the latch plate 121 and the lip will remain extended. There is no requirement for a spring 67 attached to the chain 65 to hold the latch in the engaged position as in the first and second embodiments. Because the lever arm 114 is not in contact with the end of the latch bar 125, the hook 111 will disengage the pin 19 when the deck is lowered to a working position as shown in FIG. 13.

Figure 20:
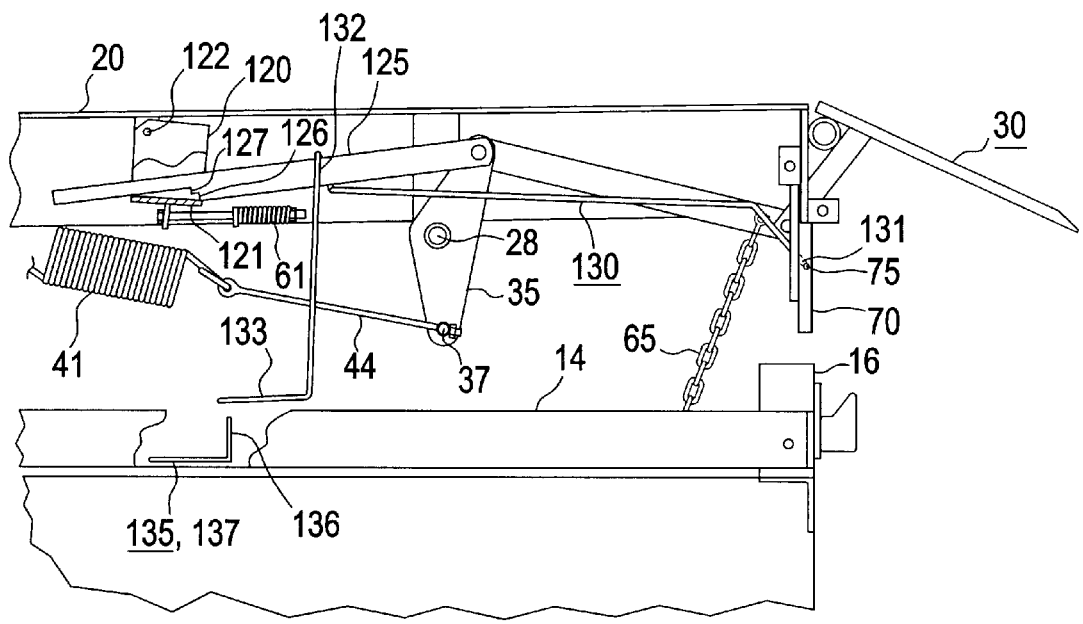
FIG. 20 is a sectional side view of the third preferred embodiment of this invention with the leveler lowered to an operative position and the lip latch deflected by an external force on the lip.

FIG. 20 illustrates how an external force exerted on the end of the lip 30 will cause the latch plate to disengage the latch bar 125. The bolt 56 and nut 57 can be adjusted so that the compression of the spring 61 will support the lip 30 in the extended position. An excessive force on the lip will cause the spring 61 to deflect and allow the latch housing 120 to rotate about the pin 123. The latch bar 125 will then be supported by the rear edge of the latch plate 121. The front edge of the latch plate will rotate downward to disengage the latch surfaces 126 and 127 and the lip 30 will be allowed to fall.

Figure 18:
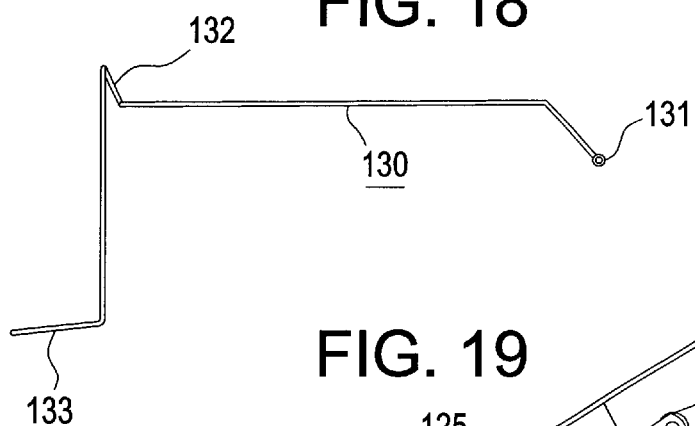
FIG. 18 is an enlarged view of the latch release rod.

FIG. 20 also illustrates a third embodiment of this invention that will release the lip latch 125 in multiple positions of the deck 20 depending on the position of the safety legs 70. A latch release rod 130 is shown in FIG. 18 with a pivot boss 131, a guide loop 132 and a contact bar 133. FIG. 20 shows a latch trip angle 135 with a vertical leg 136 and horizontal leg 137 mounted on the frame member 14. The release rod 130 is carried by the boss 131 mounted on the pin 75 of the safety legs 70 and the guide loop 132 carried by the latch bar 125. When the safety legs 70 are forward in the engaged position the latch release rod 130 is held in a forward position with the contact bar 133 above the vertical leg 136 of the angle 135. As the deck 20 lowers to bring the safety legs 70 into contact with the stop blocks 16, the contact bar 133 will engage the vertical leg 136 and cause the release rod 130 to lift the latch bar 125 out of engagement with the latch plate 121.

Figure 21:
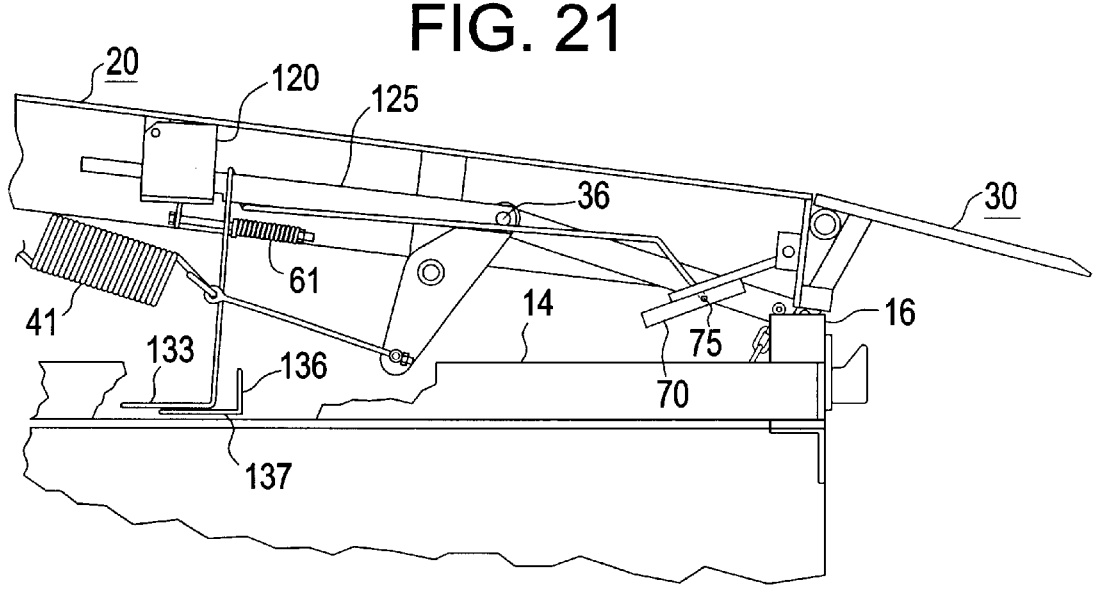
FIG. 21 is a partial sectional side view of the third preferred embodiment of this invention with the leveler fully lowered and the lip latch disengaged.

FIG. 21 shows the safety legs 70 retracted so that the deck 20 can be fully lowered. The latch release rod 130 is moved to a rearward position where the contact bar 133 will not engage the vertical leg 136 of the angle 135. As the deck 20 reaches the fully lowered position the contact bar 133 will engage the horizontal leg 137 and cause the release rod 130 to lift the latch bar 125 out of engagement with the latch plate 121 and allow the lip 30 to fall pendent.

Figure 22:
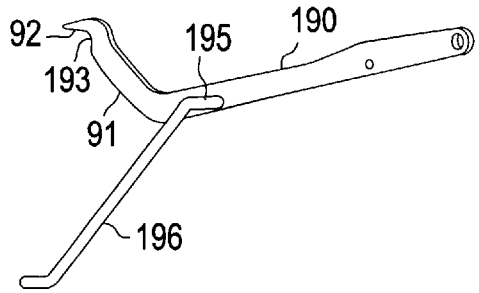
FIG. 22 is a perspective view of the lip latch of the fourth preferred embodiment of this invention.
Figure 23:
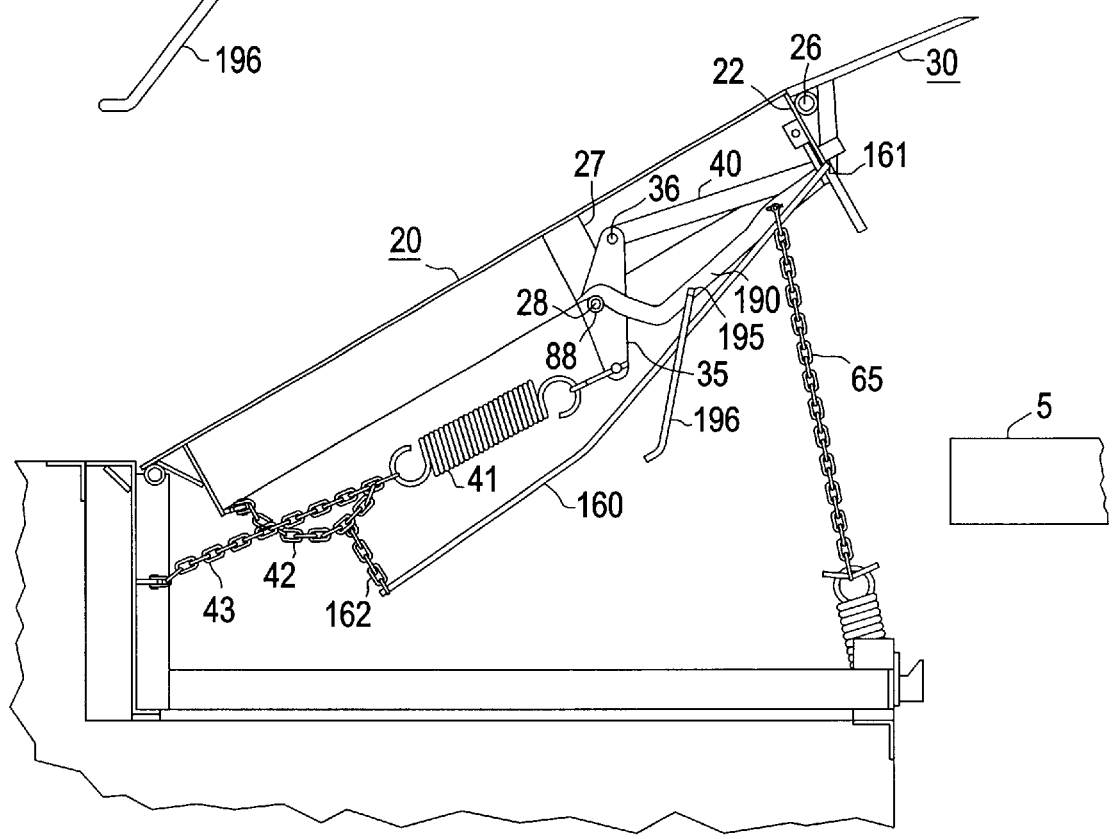
FIG. 23 is a sectional side view of the fourth preferred embodiment of this invention with the leveler raised and the lip held by the lip latch in an extended position.
Figure 24:
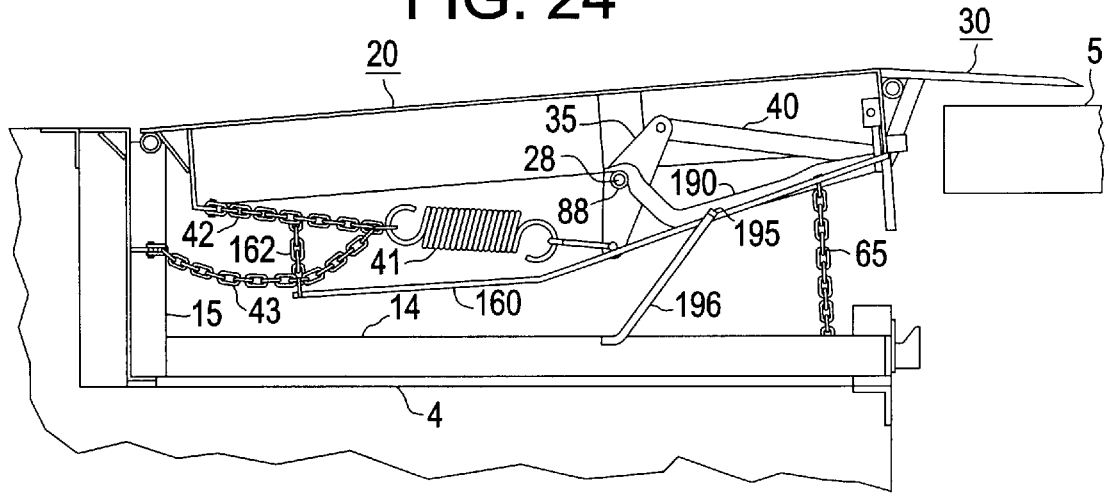
FIG. 24 is a sectional side view of the fourth preferred embodiment of this invention with the with the leveler lowered to the working range, the lip held by the lip latch in an extended position, and the lip latch spring biased toward the disengaged position.

A fourth preferred embodiment of the invention is illustrated in FIGS. 22 through 24. This embodiment is also suited for a powered dock leveler where the rate of lifting the deck is much slower and there is insufficient rotational inertia imparted to the lip 30 by the lip chain 65 to ensure that the lip is fully extended. FIG. 22 shows the latch bar 190 having a cam surface 91 and a stop surface 92. A latch surface 193 is recessed slightly from the cam surface 91. A trip bar 195 projects horizontally from the side of the latch bar 190 and has a trip rod 196 attached at a downward angle.

FIG. 23 shows the deck 20 in the fully raised position and the lip 30 fully extended. The latch bar 190 has engaged the roller 88 on the pin 28. FIG. 23 also shows a latch release spring 160 attached at the front end to a pivot bushing 161 mounted on the front header bar 22. The rear of the latch release spring 160 is supported by a chain 162 attached to the upper lip spring chain 42. Because the chain 42 is slack when the deck 20 is raised the latch release spring 160 does not engage the trip bar 195 on the lip latch bar 190.

Figure 11:
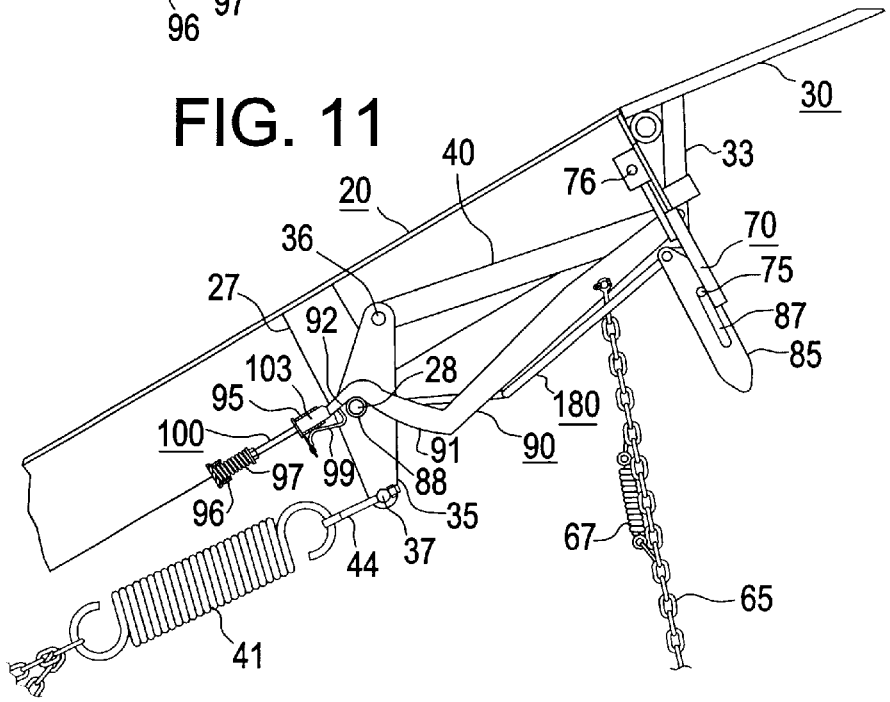
FIG. 11 is a partial sectional side view of the second preferred embodiment of this invention with the leveler raised and the lip held by the lip latch in a partially extended position.

As in the first and second preferred embodiments, in this embodiment the tension of the spring 41 increases as the deck 20 is raised and the weight of the lip 30 may not be resting on the latch bar 190. However in this embodiment the latch bar falls by gravity to the engaged position and there is no need of a spring 67 to hold the latch bar engaged as shown in FIG. 11.

In operation, as the deck lowers the latch bar remains engaged by gravity and there is no danger that the latch bar will release accidentally even though the weight of the lip 30 may not be urging the latch surface 193 into contact with the roller 88. As the deck 20 continues to lower the chain 43 attached to frame 15 causes the tension of the spring 41 to decrease until the spring is supported by the chain 42 attached to the deck 20. FIG. 23 shows the deck 20 lowered to the working range. As the chain 43 is slackened the chain 42 is tightened and the rear of the latch release spring 160 is raised until it engages the trip bar 195 on the lip latch bar 190. Because the weight of the lip 30 is resting on the latch bar 190, the force of the latch release spring 160 cannot lift the latch bar 190 from the engaged position. However as the deck continues to lower and the end of the lip 30 is supported on the bed of the transport vehicle 5 then the spring 160 will lift the lip latch bar 190 from the engaged position and the lip 30 will fall when the deck 20 is raised. If no transport vehicle is in position as the dock 20 is lowered with the lip 30 held extended then the end of the trip bar 196 will engage the floor of the pit 4 and cause the lip latch bar 190 to disengage and allow the lip 30 to fall.

While this invention has been described with respect to the preferred embodiments, it will be apparent to those skilled in this art that modifications of this invention may be practiced without departing from the scope of the invention.

I claim:

1. A dock leveler comprising:
   a frame,
   a deck pivotably mounted at one end thereof to said frame,
   a lip pivotably mounted to said deck at another end thereof, and a lip latch and lip extension mechanism comprising, a lip latch pivotably connected to said deck by a crank mechanism and a latch bar pivotably connected to said crank mechanism, said latch bar having one end selectively engaging a latch bracket mounted to said deck, a bar connected at one end to said crank mechanism and another end operably connected to said lip, a first spring operably connected to said crank mechanism and said frame, a second spring operably connected to said bar and said frame, and a third spring operably coupling another end of said latch bar to said second spring whereby, upon upward movement of said deck said first spring urges said crank mechanism in a first direction to move said bar so that said lip is raised from a pendant position to an extended position and said latch bar moves based on movement of said crank mechanism and engages said latch bracket at a first point to hold said lip in said extended position and is maintained in engagement by said third spring.

2. The dock leveler of claim 1 further comprising; safety legs mounted to the underside of said frame, a trip bar mounted for movement relative to one of said safety legs, a trip rod coupled at one end to said crank mechanism and at another end coupled to said trip bar and a trip plate attached to said frame, whereby as said deck is lowered said trip bar engages said trip plate and said trip bar moves to contact said latch bar causing movement thereof such that said latch bar automatically disengages said lip latch.

3. The dock leveler of claim 2 wherein said trip bar has a control surface that is configured to contact said lip bar as said lip extends outward.

4. The dock leveler of claim 1 further comprising a resilient stop to bias said latch bracket into contact with said end of said latch bar.

5. The dock leveler of claim 1 wherein said one end of said latch bar has a notch and an end surface defining a second point of engagement with said latch plate and the tension of said third spring applied to said another end of said latch bar holds said latch bar in engagement with said latch plate until said lip is fully extended.

6. The dock leveler of claim 1 further comprising; a trip bar mounted for movement relative to said frame, a trip rod coupled at one end to said crank mechanism and at another end coupled to said trip bar and a trip plate attached to said frame, whereby as said deck is lowered said trip bar engages said trip plate and said trip bar moves to contact said latch bar causing movement thereof such that said latch bar automatically disengages said lip latch.

7. The dock leveler of claim 6 further comprising; safety legs pivotally mounted to the underside of said frame, said trip bar having an elongated slot and one of said safety legs carrying a pin to engage said elongated slot in said trip bar to permit relative movement between said trip bar and said safety legs.

8. A dock leveler comprising:
a frame,
a deck pivotably mounted at one end thereof to said frame,
a lip pivotably mounted to said deck at another end thereof, and
a lip latch and lip extension mechanism comprising, a lip latch pivotably connected to said deck by a crank mechanism having a roller at its pivot point,
a latch bar having one end operably coupled to said lip,
a cam surface on said latch bar riding on said roller of said crank mechanism, said latch bar having another end with a latch surface selectively engaging a latch assembly mounted to said deck,
an extending bar connected at one end to said crank mechanism and another end operably connected to said lip,
a first spring operably connected to said crank mechanism and said frame,
a second spring operably connected to said latch bar and said frame, whereby, upon upward movement of said deck said first spring urges said crank mechanism in a first direction to move said extending bar so that said lip is raised from a pendant position to an extended position and said latch bar moves based on movement of said crank mechanism and engages said latch assembly to hold said lip in said extended position and is maintained in engagement by said second spring.

9. The dock leveler of claim 8 further comprising; safety legs mounted to the underside of said frame, a trip bar mounted for movement relative to one of said safety legs, a trip rod coupled at one end to said crank mechanism and at another end coupled to said trip bar and a trip plate attached to said frame, whereby as said deck is lowered said trip bar engages said trip plate and said trip bar moves to contact said latch bar causing movement thereof such that said latch bar automatically disengages said lip latch.

10. The dock leveler of claim 9 wherein said trip bar has a control surface that is configured to contact said lip bar as said lip extends outward.

11. The dock leveler of claim 8 wherein said latch assembly comprises a an adjustable bolt carrying a flange and resilient stop to bias said flange into contact with said end of said latch bar.

12. The dock leveler of claim 11 wherein said latch assembly further comprises a latch release spring applied to said another end of said latch bar to displace said latch bar from engagement with said roller when said lip is fully extended.

13. The dock leveler of claim 8 further comprising; a trip bar mounted for movement relative to said frame, a trip rod coupled at one end to said crank mechanism and at another end coupled to said trip bar and a trip plate attached to said frame, whereby as said deck is lowered said trip bar engages said trip plate and said trip bar moves to contact said latch bar causing movement thereof such that said latch bar automatically disengages said lip latch.

14. The dock leveler of claim 13 further comprising; safety legs pivotally mounted to the underside of said frame, said trip bar having an elongated slot and one of said safety legs carrying a pin to engage said elongated slot in said trip bar to permit relative movement between said trip bar and said safety legs.

15. A dock leveler comprising:
a frame,
a deck pivotably mounted at one end thereof to said frame,
a lip pivotably mounted to said deck at another end thereof, and
a lip latch and lip extension mechanism comprising, a lip latch pivotably connected to said deck by a crank mechanism,
a latch bar having one end operably coupled to crank mechanism, an extending bar having one end operably connected to said lip and another end coupled to said crank mechanism,
a latch housing mounted to said deck and carrying a latch plate, said latch bar having another end with a plurality of latch surfaces selectively engaging said latch plate, a link assembly mounted to said deck and carrying a hook assembly, a spring operably connected to said crank mechanism and said hook assembly, said hook assembly having first and second surfaces selectively contacting said latch bar, whereby, upon upward movement of said deck said spring urges said crank mechanism in a first direction to move said latch bar so that said lip is raised from a pendant position to an extended position and said latch bar moves based on movement of said crank mechanism and engages said latch plate to hold said lip in said extended position.

16. The dock leveler of claim 15 further comprising; a contact bar coupled to said latch bar and said latch housing pivotally attached to said frame, a resilient member mounted to said deck to bias said latch housing in one direction by contact with said contact bar, whereby as said deck is lowered said contact bar disengages from said resilient member and said latch bar is moved out of contact said latch plate such that said lip latch is automatically disengaged.

17. The dock leveler of claim 16 wherein said latch bar has a plurality of stepped engagement surfaces that are configured to selectively contact said latch plate as said lip extends outward.

18. The dock leveler of claim 15 wherein said hook comprises a first arm defining said first surface and a cantilevered spring defining said second surface, said second surface holding said other end of said latch bar out of when said lip is in contact with a bed of a vehicle.

19. The dock leveler of claim 15 wherein said link assembly comprises a fixed member having a slot and coupled to said deck, and a link bar carrying a pin engaging said slot, said link bar connected to said hook assembly.

20. The dock leveler of claim 15 further comprising; a pin mounted to said frame and at another end of said hook assembly a hook to engage said pin when said deck when said lip is in the pendant position as said deck is raised.

21. The dock leveler of claim 20 further comprising; safety legs pivotally mounted to the underside of said frame, a trip bar pivotally mounted to one of said safety legs and a trip latch mounted to said frame and carrying a vertically extending member.

22. A dock leveler comprising:

a frame;

a deck pivotably mounted at one end thereof to said frame;

a lip pivotably mounted to said deck at another end thereof;

a lip extension mechanism comprising, a crank mechanism pivotably attached to the underside of said deck and a lip latch pivotably connected to said crank mechanism at one end thereof and to said deck at the other end thereof;

a lip spring tension member connected at one end to said crank mechanism and at another end thereof to said deck and to said frame;

wherein, said lip spring tension member is tensioned upon upward movement of said deck and as said lip is partially counterbalanced but downwardly biased by its weight throughout a working range of said dock leveler by said lip spring tension member; and a latch release spring coupled at one end to said lip and at another end, operably coupled to said spring tension member such that as said deck is lowered, one portion of said spring tension member is slackened while another portion is tensioned and said latch release spring contacts a trip bar to disengage said lip from said lip extension mechanism.

* * * * *